H. Koeller.
Domestic Spinning Mach.

Nº 57,336. Patented Aug. 21, 1866.

Witnesses,
Jas. A. Sewice
D. W. B. Carrington

Inventor,
H. Koeller
Per Munn &
Attorneys

UNITED STATES PATENT OFFICE.

H. KOELLER, OF CAMP POINT, ILLINOIS.

IMPROVEMENT IN HAND SPINNING-MACHINES.

Specification forming part of Letters Patent No. 57,336, dated August 21, 1866.

*To all whom it may concern:*

Be it known that I, H. KOELLER, of Camp Point, Adams county, and State of Illinois, have invented a new and Improved Spinning-Wheel; and I do hereby declare that the following is a full, clear, and exact description thereof, which will enable others skilled in the art to make and use the same, reference being had to the accompanying drawings, forming part of this specification, in which—

Figure 1:
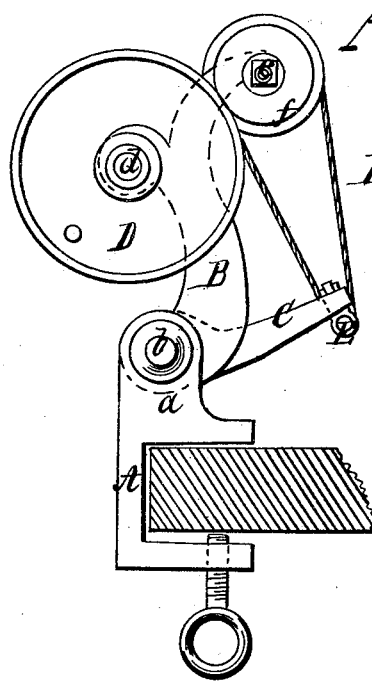
Figure 2:
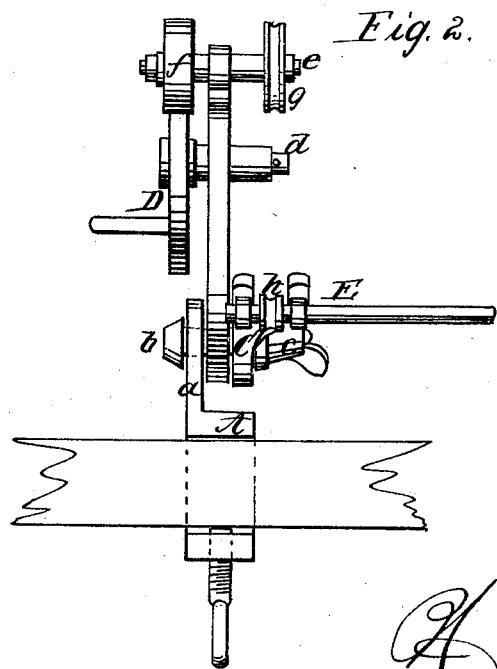

Figure 1 represents a side elevation of this invention. Fig. 2 is a front view of the same.

Similar letters of reference indicate like parts.

This invention relates to a hand spinning-wheel which is mounted on a swivel-standard secured by a screw-pivot to a screw-clamp, and furnished with a forked arm, which forms the bearings for the spindle, and which is adjustable independent of the standard in such a manner that the distance between the spindle and the pulley from which it derives its motion can be increased or decreased for the purpose of tightening or releasing the belt: and, furthermore, the driving-wheel can be adjusted in any convenient height to suit the stature of different persons or the position in which they may desire to operate the spinning-wheel.

A represents an ordinary U-shaped screw-clamp, which is intended to secure the spinning mechanism to a table or shelf, or to any other article of a similar nature. From this screw-clamp projects a lug or ear, $a$, which forms the bearing for the screw-pivot $b$, on which are mounted the swivel-standard B and the arm C. A suitable nut, $c$, on the end of the screw $b$ serves to secure the standard and the arm after the same have been adjusted in the desired position.

The standard B forms the bearings for two shafts, $d$ $e$, one of which carries the driving-wheel D, from which motion is imparted to the shaft $e$ by an india-rubber disk, $f$, which is mounted on the shaft $e$ and bears against the circumference of the driving-wheel D.

By these means the motion from the driving-wheel is transmitted to the shaft $e$ without noise, which cannot be avoided if the motion is transmitted by means of cog-wheels.

From the shaft $e$ motion is imparted to the spindle E by a belt stretched over a pulley, $g$, mounted on the shaft $e$, and over a whirl, $h$, mounted on the spindle. The spindle has its bearings in suitable boxes secured to the bifurcated end of the arm C, and by turning this arm on the screw-pivot $b$ the tension of the belt can be regulated to suit circumstances.

After the clamp has been secured to a table or other convenient place the height of the driving-wheel is adjusted to suit the stature of the operator or the position in which he or she may desire to work the wheel—that is to say, in a sitting or standing position—and by turning the wheel D the operation of spinning can be carried on with the greatest ease and facility.

What I claim as new, and desire to secure by Letters Patent, is—

1. The swivel-standard B, forming the bearings for the shafts $d$ $e$, and the bifurcated arm C, forming the bearings for the spindle E, in combination with the screw-clamp A, constructed and operating substantially as and for the purpose described.

2. The driving-wheel D and india-rubber disk $f$, standard B, arm C, spindle E, and screw-clamp A, all constructed and operating substantially as and for the purpose set forth.

HERMANN KOELLER.

Witnesses:
JOHN A. ROTH,
SAMUEL L. MORSE.